March 17, 1959
J. R. LONG
2,877,528
VARIABLE SPEED MECHANISM
Filed Feb. 27, 1957
3 Sheets-Sheet 1
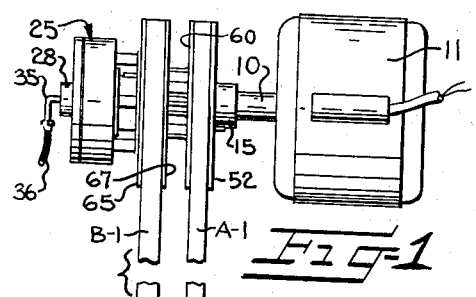
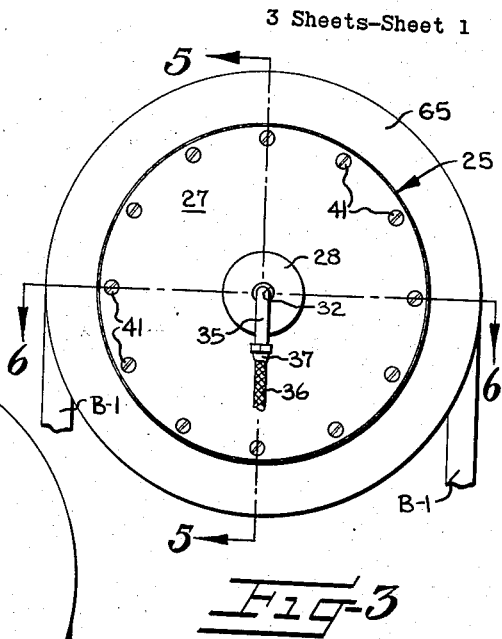
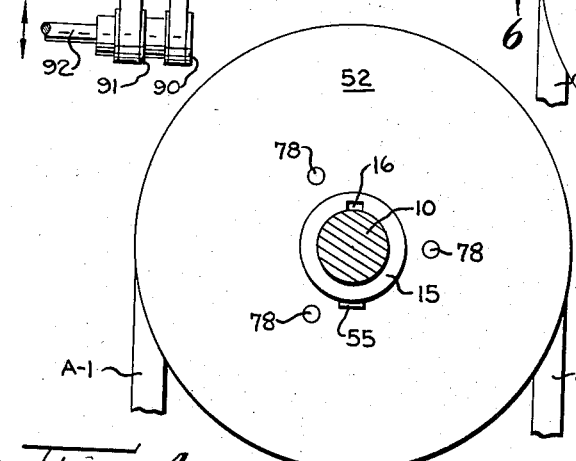
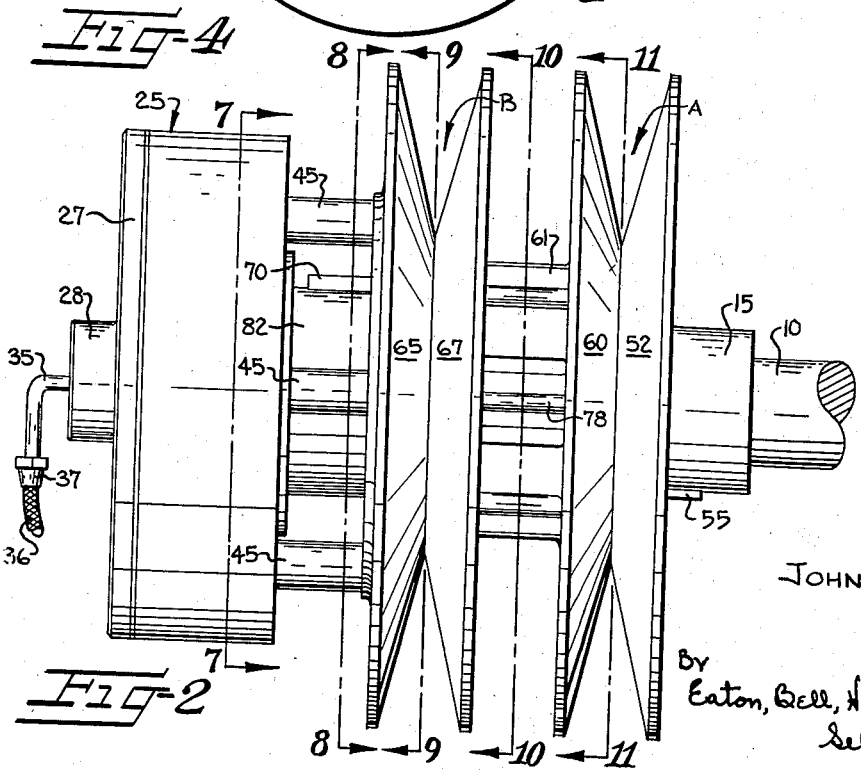
JOHN R. LONG,
INVENTOR
BY Eaton, Bell, Hunt + Seltzer
ATTORNEYS

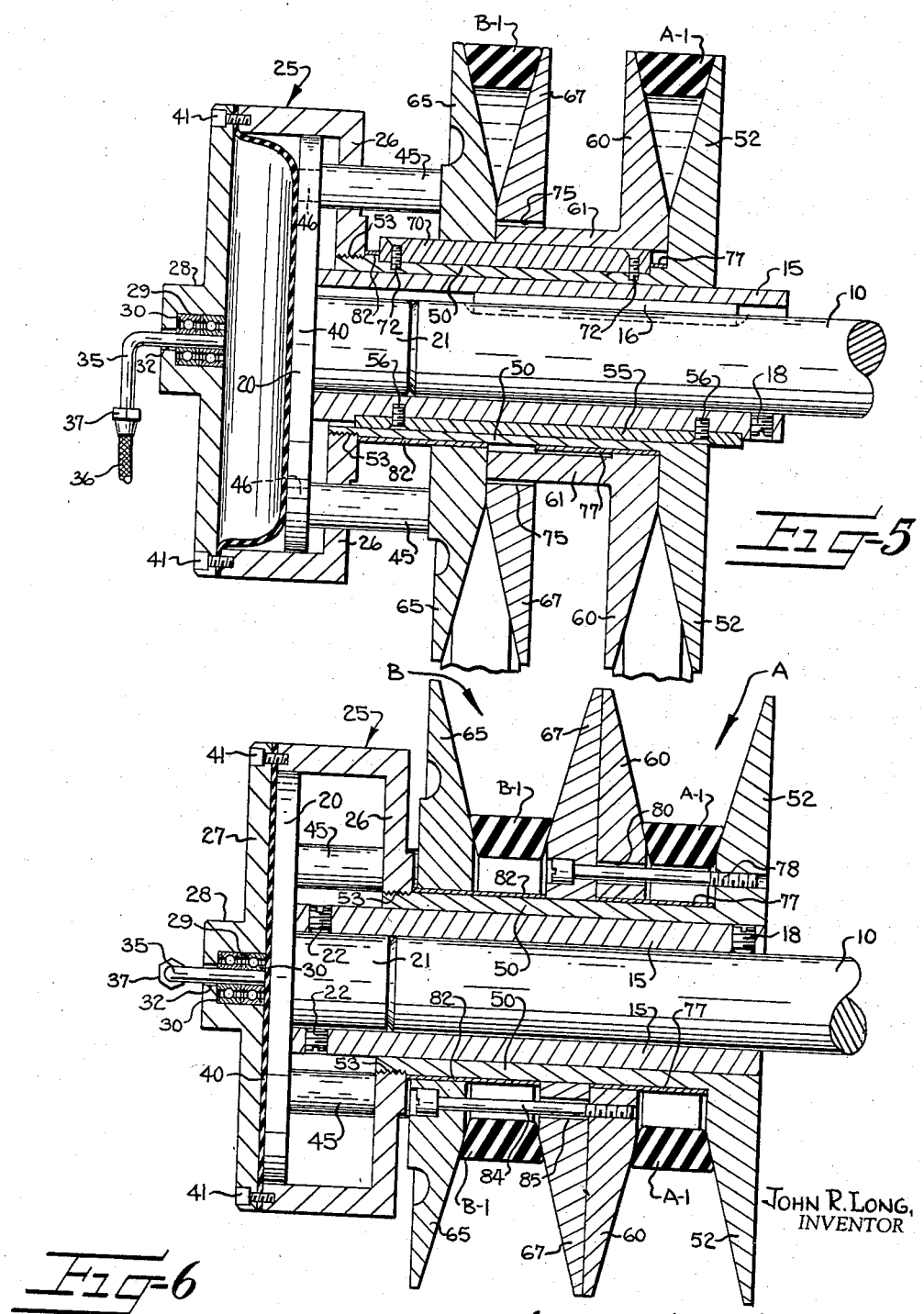

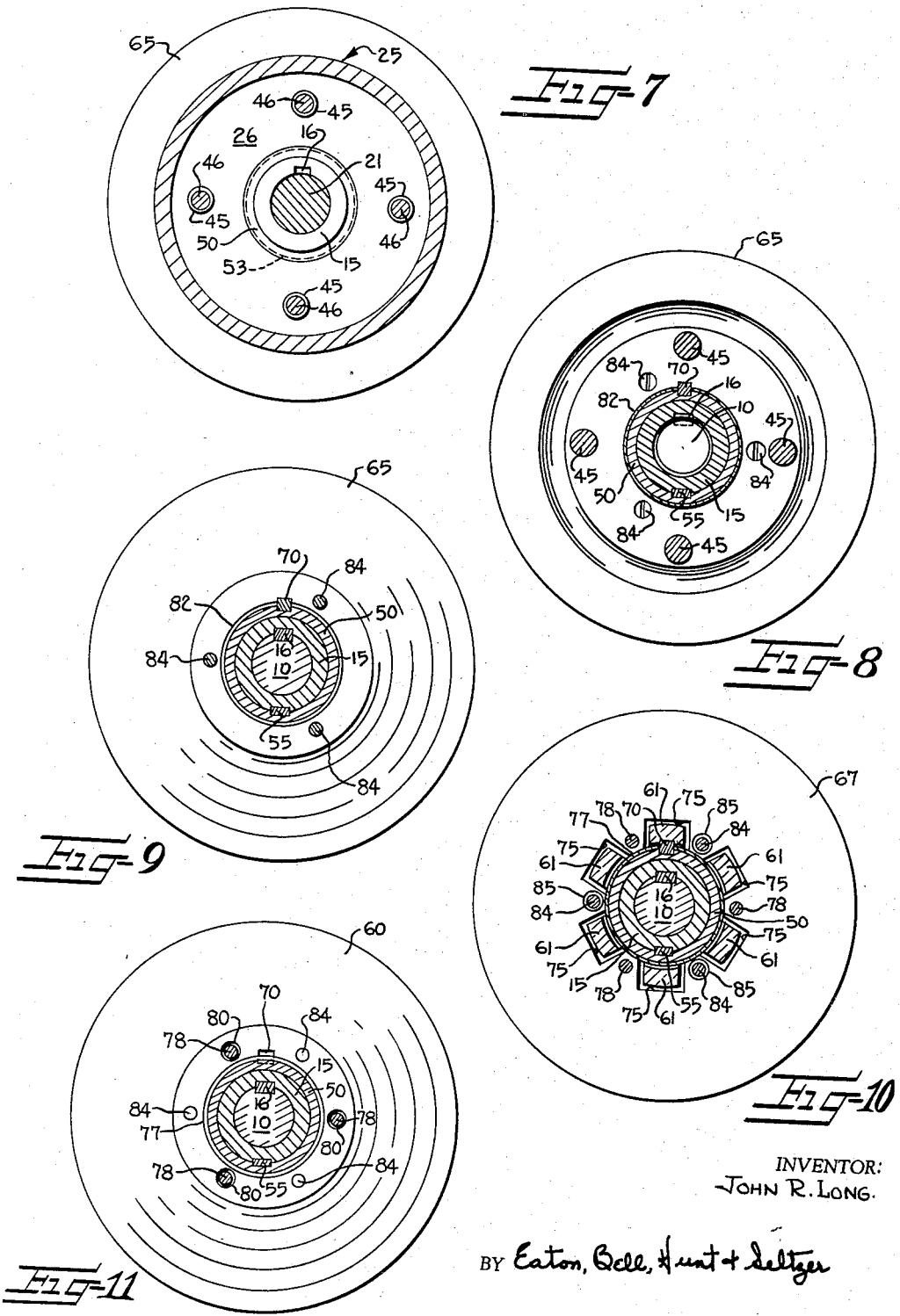

United States Patent Office 2,877,528
Patented Mar. 17, 1959

2,877,528

VARIABLE SPEED MECHANISM

John R. Long, Hickory, N. C., assignor to Shuford Mills, Inc., Hickory, N. C., a corporation of North Carolina Application February 27, 1957, Serial No. 642,805

8 Claims. (Cl. 74—230.17)

This invention relates to variable speed drive mechanisms and is particularly concerned in improvements in variable speed pulley units of the character disclosed in my copending U. S. application, Serial No. 418,536, filed March 25, 1954, and entitled, Variable Speed Drive, now U. S. Patent No. 2,810,296, of which the present application is a continuation-in-part.

The variable speed drive disclosed in said copending application comprises one or more pairs of mating flanges or cones wherein each flange is mounted for independent axial movement on a shaft and fixed against rotation relative to the shaft. A cylinder and a fluid-actuated piston within the cylinder are located outwardly and axially of one end of the shaft with one of the flanges of each pair being connected to the cylinder and the other of the flanges of each pair being contacted by circularly arranged members fixed to the piston so that, upon obverse relative movement between the piston and the cylinder, the flanges of each pair move toward each other and, upon reverse relative movement between the flanges, as effected by a tensioned V-belt entrained about the pulley unit, reverse relative movement is effected between the piston and the cylinder.

Now, it has been found that, in instances where the pulley unit of the character described has been used in installations requiring a relatively small variation in the speed changes effected by the variable speed pulley unit, the pulley unit of said copending application has operated satisfactorily. However, where there has been a relatively large variation in the speed changes effected by the pulley unit, it has been found that the friction between the flanges or cones and the parts on which they are mounted has caused one of the flanges of each pair to remain in off-set position relative to a pulley on another shaft interconnected therewith by the said V-belts or V-belt when the effective diameters of the pulleys were changed materially so the other flange or cone of each pair would move toward the mating flange or cone rather than both flanges or cones moving toward each other to a common center. It is apparent that this would cause the V-belts or V-belt to become worn excessively on one side or the other, or both and might even cause the belts to ride off the corresponding pulleys.

It is therefore an object of this invention to provide a variable speed drive mechanism utilizing a pulley unit of substantially the character heretofore described, and thereby making available the compactness, simplicity of manufacture and utility of such a pulley unit, but wherein one of the flanges of each pair is maintained in fixed relation to the shaft on which the pulley unit is mounted and so that, at the time of installation of the pulley unit on the shaft, it is anticipated that only one of the flanges of each pair will move with changes in the effective diameter of the pulley unit, so the extent to which the movable flange of each pair moves may be taken into consideration in alining the pulley unit with the pulley or pulleys of an adjacent shaft to be driven by or from the present pulley unit.

Some of the objects of the invention having been stated, other objects will appear as the description proceeds when taken in connection with the accompanying drawings, in which—

Figure 1 is a somewhat schematic view of the present invention showing the variable speed mechanism mounted on the shaft of an electric motor adjacent a laterally movable shaft;

Figure 2 is an enlarged plan view of the variable speed mechanism mounted on a shaft but omitting the electric motor and the V-belts;

Figure 3 is an elevation, on a reduced scale, looking at the left-hand end of the variable speed drive in Figure 2;

Figure 4 is an elevation, on a reduced scale, looking at the right-hand end of the variable speed drive in Figure 2;

Figure 5 is a longitudinal vertical sectional view showing the pulley flanges in a relatively contracted position taken substantially along the line 5—5 in Figure 3;

Figure 6 is a longitudinal sectional plan view taken substantially along the line 6—6 in Figure 3, but showing the pulley flanges in expanded position;

Figures 7 through 11 are reduced transverse sectional views taken along the respective lines 7—7, 8—8, 9—9, 10—10 and 11—11 in Figure 2.

Referring more specifically to the drawings, the numeral 10 designates a shaft which may be driven by an electric motor 11 connected to a suitable source of electrical energy, not shown, or by any other suitable means. An inner sleeve 15 is fixed on the shaft 10, as by set-screws 18 and a key 16 (Figures 5 and 6 through 11). A piston 20 is suitably secured to, or may be formed integral with, the outer end of the inner sleeve 15, outwardly and axially of the shaft 10. To this end, the piston 20 is provided with a hub 21 which fits in the outer end of the inner sleeve 15 and is secured in the sleeve 15, as by set-screws 22 (Figure 6).

The piston 20 is mounted for axial movement in a cylinder broadly designated at 25. The cylinder 25 has closed opposite ends; that is, the inner and outer ends of the cylinder 25 are closed by an inner end wall 26 and an outer end wall or cover 27. The cover 27 preferably has a hub 28 thereon provided with an inner cavity 29 in which the inner end of a pipe fitting or conduit 35 is positioned in such a manner as to form a rotary connection between the cylinder 25 and the pipe connection 35. To this end, anti-friction bearings 30 have their outer races fixed in the cavity 29, as by a pressed fit, and the corresponding end of the pipe fitting 35, shown as being L-shaped in Figures 1, 2 and 5, is secured in the inner races of said bearings 30, as by a pressed fit.

It will be noted that the outer end of the hub 28 is provided with a restricted bore or opening 32 therein, outwardly through which the pipe fitting 35 loosely extends. The tubular pipe fitting or connection 35 has a flexible conduit or air-hose 36 suitably connected thereto as by a gland nut 37. The conduit 36 extends to the fitting 35 from a suitable source of fluid pressure (not shown), preferably compressed air, which fluid pressure may be manually controlled or may be controlled by means such as is disclosed in my copending application Serial Number 539,130, filed October 7, 1955, now Patent No. 2,803,107, and entitled, Speed Control for Winding Machines.

A suitable piston ring or O-ring may provide a seal between the piston 20 and the circular wall of the cylinder 25. However, in the interests of economy of construction and maintenance of the improved pulley unit, it will be observed in Figures 5 and 6 that a flexible diaphragm 40, preferably made from rubber or similar material, is positioned between the piston 20 and the outer end wall or cover 27 of the cylinder 25. The diaphragm 40 is held in position by a plurality of screws 41 which penetrate the cylinder closure or cover 27 and the outer portion of the diaphragm 40 and which are threaded into the outer end of the circular wall of the cylinder 25. Thus, the diaphragm 40 forms an air-tight seal between the cylinder 25, the cover 27 and the piston 20.

It is apparent that introduction of fluid pressure into the cylinder 25 causes the cylinder 25 to move from right to left from substantially the position shown in Figure 6 to substantially that shown in Figure 5, since the piston 20 is fixed, through the sleeve 15, to the shaft 10 and causes the cylinder 25 to move axially of the shaft 10. The inner end wall 26 of the cylinder 25 is penetrated by a plurality of rods 45. In this instance, the piston rods 45 have reduced inner portions 46 threaded into or otherwise fixed to the piston 20.

The cylinder 25 is fastened to an outer sleeve 50 suitably secured to or formed integral with a first cone or flange 52. Thus, the outer sleeve may also be termed as a hub. The outer sleeve 50 may be secured to the inner end wall 26 of the cylinder 25 by any suitable means, such as by being threaded thereinto, as at 53.

In order to insure that the flange or cone 52 is fixed to prevent relative rotation between it, the sleeve 15 and the shaft 10, while permitting axial movement of the cone 52 and its hub 50, it will be observed in Figure 5 that the outer sleeve 50 is keyed on the inner sleeve 15, as by a key 55. In this instance, the key 55 is fixed to the inner sleeve 15, as by screws 56. It will be noted that the cone or flange 52 is disposed adjacent and axially of a mating inclined flange or cone 60 and another pair of mating inclined flanges or cones 65, 67 is positioned between the flange 60 and the cylinder 25. The flanges 52, 60 form one pulley broadly designated at A, and the other pair of flanges 65, 67 forms another pulley broadly designated at B. The ends of the piston rods 45 remote from the piston 20 engage the outer end of flange 65, and may be secured to the outer end of the flange 65, if desired.

As will be more fully described hereinafter, the flanges 52, 67 are axially movable relative to the shaft 10 and sleeve 15 and the flanges 60 and 65 are fixed relative to the shaft 10 and the inner sleeve 15. The flange or cone 60 is provided with a plurality of circularly spaced legs or axially extending projections 61 which extend parallel to the axis of the shaft 10 and serve as spacing members, with their ends remote from the flange 60 abutting the outermost flange 65 of the V-pulley B. V-belts A-1, B-1 are entrained over the respective pulleys A, B.

The cones or flanges 60, 65, 67 are prevented from rotation relative to the cone 52 and relative to each other. To this end, one of the legs 61 of the flange 60 of pulley A is keyed to the outer sleeve or hub 50, as by a key 70 suitably secured to the outer sleeve 50, as by screws 72. The outer flange 65 of the pulley B is also keyed to the outer sleeve 50 by the key 70. It will be noted that the legs 61 on the flange 60 of the pulley A loosely penetrate openings or slots 75 provided in the adjacent cone or flange 67 of the pulley B (Figures 5 and 10) so the flange 67 may move axially of the flanges 60, 65. In order to insure that the flanges 60, 65 do not move apart from each other, screws 84 are arranged between certain adjacent legs 61 (Figures 6, 9 and 10) and extend between and are fixed to the flanges 60, 65. It will be noted that the screws 84 loosely extend through suitable openings 85 provided in the flange 67.

It will be observed in Figure 6 that the flange 67 is held in spaced relationship to the flange 52 by a ring or spacing member 77 which loosely or snugly encircles the outer sleeve or hub 50 of the flange 52 and whose opposite ends engage the proximal surfaces of the flanges 52, 67. The cone 67 is held against the corresponding end of the spacing ring 77 by means of a plurality of circularly arranged screws 78 (Figures 6, 10 and 11) which are disposed between certain adjacent legs 61 and which loosely penetrate openings 80 provided therefor in the flange 60 of the pulley A. Thus, the screws 78 also assist in preventing rotational movement of the flange 67 relative to the flange 52.

Relative movement betweeen the flanges 52 and 67 of the respective pulleys A, B is further prevented by a ring or spacing member 82 which also surrounds the hub or outer sleeve 50 of the flange 52 and whose opposite ends bear against the proximal surfaces of the inner closure member 26 of cylinder 25 and the flange 67. It will be noted that the spacing members 77 and 82 are preferably slidable within the respective flanges 60, 65. Also, it will be noted that the key 70 carried by the hub or outer sleeve 50, in the upper portion of Figure 5, extends through the spacing members or rings 77, 82 so the flanges 60, 65 and the interconnecting legs 61 may be keyed on the key 70.

The annular spacing members 77, 82 facilitate ease and economy of manufacture and assembly of the improved pulley unit, particularly in view of the fact that the flanges 52, 60, 65, 67 may be made from cast iron or other metal and the spacing members 77, 82 may be made from a relatively softer or non-ferrous metal such as brass. Thus, with continued used of the apparatus the flanges 60, 65 will wear stock from the peripheries of the spacing members 77, 82 rather than from their own inner surfaces or from the periphery of the outer sleeve 50. It is then a simple matter to replace the spacing members 77, 82 with new spacing members.

From the foregoing description, it is apparent that the piston 20 and flanges 60, 65 remain in fixed position relative to the inner sleeve 15 and the shaft 10 while the cylinder 25, the outer sleeve 50, the spacing members 77, 82 and the flanges 52, 67 are movable unitarily axially of and relative to the shaft 10, inner sleeve 15, piston 20, piston rods 45 and the flanges 60, 65.

The V-belts A-1, B-1 are shown in Figure 1 as also being entrained over suitable fixed diameter pulleys 90, 91 fixed on a second or driven shaft 92, the speed of which may be varied by the variable tension pulleys A, B. It is apparent that the shaft 92 and pulleys 90, 91 should be so mounted as to move toward and away from said variable pitch pulleys A, B as the effective diameters of said variable pitch pulleys are respectively increased and decreased. Of course, the driven shaft 92 may be mounted in fixed bearings and provided with variable pitch pulleys thereon on which the belts A-1, B-1 may be entrained, if desired, in a manner well known in the art. Also, it is to be distinctly understood that the shaft 92 may be the driving shaft and the shaft 10 may be the driven shaft without departing from the spirit of the invention.

In order to minimize the extent to which the V-belts A-1, B-1 may be axially shifted, at the improved pulley unit or assembly mounted on shaft 10, relative to the portions thereof which are entrained over the pulleys 90, 91 on shaft 92, the flanges 52, 60 and 65, 67 of the respective pulleys A, B should be adjusted so the effective diameters of the pulleys A, B are approximately halfway between the maximum and minimum diameters at which they will operate at the time they are alined with the pulleys 90, 91 on shaft 92.

In operation, assuming that the variable speed pulley unit occupies substantially the position shown in Figure 6; that is, with the V-belts A-1, B-1 at a point in relatively close proximity to the hub 50 (or spacing members 77, 82) so the belts A-1, B-1 may be driven to impart a minimum rate of speed to the pulleys 90, 91 (Figure 1) any desired increase in speed may be effected by merely admitting air or other fluid pressure into the cylinder 25. Upon air being admitted into the cylinder 25, the resultant pressure will expand the diaphragm 40 and force the same against the piston 20 and thereby move the cylinder 25 outwardly or from right to left from the position shown in Figure 6 to that shown in Figure 5, for example.

In so doing, the inner closure member or wall 26 of the cylinder 25 moves to the left relative to the piston rods 45, thus moving the outer sleeve 50 and the flanges 52, 67 therewith. On the other hand, the flanges 60, 65 remain fixed as to axial movement. It is obvious that the closer flanges 52, 67 are positioned or contracted relative to the respective flanges 60, 65 the higher the V-belts A-1, B-1 will climb up the inclined proximal surfaces of the flanges 52, 60, and 67, 65, respectively, to thus increase the pitch diameter of the variable speed drive pulleys A, B and to correspondingly increase the speed of pulleys 90, 91.

In the event that the belts A-1, B-1 need to have their speed decreased, it is merely necessary to remove some or all of the pressure from the cylinder 25 to permit the cylinder 25 to move from left to right under the pressure of the tensioned V-belts A-1, B-1. In this manner, the flanges 52, 67 are moved away from the respective flanges 60, 65 to decrease the pitch diameter of the variable speed pulleys A, B and thereby decrease the speed at which the belts A-1 and B-1 travel.

Although it is well known in the art to provide variable speed pulleys comprising mating pairs of flanges or cones with means for moving one of the flanges relative to the other to effect variations in the pitch diameter of the pulleys, it is thus seen that I have provided a novel manner of constructing a variable speed pulley unit to effect this result and wherein the pulley has the simplicity and economy of manufacture, operation and maintenance afforded by pulleys of the character disclosed in my said copending application Serial Number 418,536, now U. S. Patent No. 2,810,296.

In order to clearly establish the relationship of the various components of the present variable speed pulley unit or assembly in the claims, the flanges 52, 67 may be termed as first flanges and the flanges 60, 65 may be termed as second flanges. Also, the flanges 52, 67, 60, 65 may be respectively termed as first, second, third and fourth flanges.

In the drawings and specification there has been set forth a preferred embodiment of the invention and, although specific terms are employed, they are used in a generic and descriptive sense only and not for purposes of limitation, the scope of the invention being defined in the claims.

I claim:

1. A variable speed mechanism for a rotatable shaft comprising a pulley adapted to be mounted on said shaft and adapted to have a tensioned V-belt entrained thereabout, said pulley comprising at least one pair of flanges having inclined proximal surfaces, a sleeve attached to one of said flanges, said sleeve being mounted for axial movement on one end of said shaft and fixed against rotation relative to said shaft, the other flange being loose on said sleeve and fixed against rotation relative to said sleeve, a cylinder element, a piston element in said cylinder element, said elements being located outwardly of said one end of said shaft and in coaxial relation to said shaft, means connecting one of said elements to an end of the sleeve remote from the flange connected thereto, means fixing the other of said flanges against axial movement relative to said shaft, means establishing a fixed connection between said other of said elements and said shaft, means for introducing fluid pressure into and exhausting fluid pressure from the cylinder element to effect relative movement between the elements to move the flange connected to said sleeve toward the other flange upon introduction of fluid pressure into the cylinder while said other flange is retained in fixed position relative to the shaft, and to permit the tensioned V-belt to move the flange connected to said sleeve away from the other flange upon fluid pressure being exhausted from the cylinder.

2. A structure according to claim 1 wherein the element connected to the end of the sleeve remote from the flange attached thereto is the cylinder and the other of said elements is the piston, and wherein the said means establishing a fixed connection between said other of the elements and the shaft includes an inner sleeve fixed on said end of the shaft and about which said first-mentioned sleeve is mounted for axial movement while being restrained against rotation relative to the inner sleeve, and means securing said piston to the corresponding end of said inner sleeve.

3. A variable speed pulley unit adapted to be mounted on a shaft and to have a tensioned V-belt entrained thereabout, said unit comprising first and second mating flanges, an elongated hub on the first flange, said second flange being mounted for axial movement on and fixed against rotation relative to said hub, a sleeve keyed on said shaft to prevent relative axial movement therebetween and on which said hub is keyed for axial movement, a piston fixed to one end of said sleeve and disposed outwardly of and axially of one end of the shaft, a cylinder within which said piston is mounted, means securing said cylinder to the end of the hub opposite from said first flange, means fixing said second flange against axial movement relative to said shaft, means for introducing fluid pressure into and exhausting fluid pressure from the cylinder at that end of the piston opposite from the sleeve whereby, upon introduction of fluid pressure, the cylinder is moved outwardly relative to the piston to move the hub and first flange therewith relative to the sleeve and shaft and thereby move the first flange toward the second flange and, upon exhausting fluid pressure from the cylinder, the tensioned V-belts move the first flange, the hub and the cylinder in the opposite direction relative to the second flange, the piston, the sleeve and the shaft.

4. A variable speed drive comprising a rotatable shaft, at least one pulley mounted thereon and adapted to have a tensioned V-belt entrained thereabout, said pulley comprising a pair of mating flanges, a cylinder, a fluid pressure actuated piston within the cylinder, said cylinder and piston being located outwardly of and axially of one end of said shaft, said pair of flanges being fixed against rotation relative to said shaft, means mounting one of said flanges on one end of said shaft for axial movement with said cylinder relative to said shaft, said piston being secured to said shaft, and means on said piston engaging the other of said flanges whereby, upon obverse relative movement between the piston and cylinder, said one of the flanges moves toward the other flange and, upon reverse movement of said one of the flanges away from the other flange, as effected by the tensioned V-belt, reverse relative movement is effected between the piston and the cylinder.

5. A structure according to claim 4 having a flexible diaphragm positioned in the cylinder between the outer end of the cylinder and the piston, and means for introducing compressed-air into and exhausting compressed-air from between the diaphragm and said outer end of the cylinder.

6. A variable speed drive comprising a rotatable shaft, at least one pulley mounted thereon and adapted to have a tensioned V-belt entrained thereabout, said pulley comprising first and second mating flanges, said first flange being mounted for independent axial movement on said shaft and both flanges being fixed against rotation relative to said shaft, a cylinder, a fluid pressure actuated piston within the cylinder, said cylinder and piston being located outwardly of and axially of one end of said shaft, said first flange being secured to the cylinder, said piston being secured to said shaft, and a rigid connection between said piston and the second flange whereby, upon obverse relative movement between the piston and cylinder, said first flange moves toward the other flange and, upon reverse movement of said first flange away from the other flange, as effected by the tensioned V-belt, reverse relative movement is effected between the piston and the cylinder.

7. A variable speed drive mechanism for a rotatable shaft comprising a pulley adapted to be mounted on said shaft and adapted to have a tensioned V-belt entrained thereabout, said pulley comprising a pair of flanges having inclined proximal surfaces thereon, means to mount said flanges for relative axial movement on said shaft comprising a sleeve mounted for axial movement on one end of said shaft and fixed against rotation relative to said shaft, one of said flanges being fixed on said sleeve, the other flange being loose on said sleeve and fixed against rotation on said sleeve, a cylinder element, a piston element in said cylinder element, said elements being located outwardly of said one end of said shaft in coaxial relation to said shaft, means connecting one of said elements to said sleeve, means on the other of said elements contacting the other of said flanges, a fixed connection between said other of the elements and the shaft, means for introducing fluid pressure into and exhausting fluid pressure from the cylinder element to effect relative movement between the elements to move the flange fixed on said sleeve toward said other flange upon introduction of fluid pressure to the cylinder, and to permit the tensioned V-belt to move said one of the flanges away from said other flange upon fluid pressure being exhausted from the cylinder.

8. A variable speed drive mechanism for a rotatable shaft comprising a pulley adapted to be mounted on said shaft and adapted to have a tensioned V-belt entrained thereabout, said pulley comprising first and second flanges having inclined proximal surfaces thereon, means to mount said flanges for relative axial movement on said shaft comprising a sleeve mounted for axial movement on one end of said shaft and fixed against rotation relative to said shaft, said first flange being fixed to said sleeve, the second flange being loose on said sleeve and fixed against rotation on said sleeve, a cylinder, a piston in said cylinder, said cylinder and piston being located outwardly and axially of said one end of said shaft, means securing one end of said cylinder to the sleeve, a plurality of legs engaging the face of the second flange opposite from the first flange and loosely penetrating said one end of the cylinder and being attached to said piston, means securing said piston to said one end of said shaft, and means for introducing fluid pressure into and exhausting fluid pressure from between the other end of the cylinder and the piston to move the first flange toward the second flange upon introduction of fluid pressure into the cylinder, and to permit the first flange to be moved away from the second flange by the V-belt upon exhausting the fluid pressure from the cylinder.

References Cited in the file of this patent

UNITED STATES PATENTS

| | | |
|---|---|---|
| 1,035,860 | Conradson | Aug. 20, 1912 |
| 2,275,429 | Hallinan | Mar. 10, 1942 |
| 2,369,681 | Miles | Feb. 20, 1945 |
| 2,459,377 | Hallinan | Jan. 18, 1949 |
| 2,709,373 | Barron | May 31, 1955 |